United States Patent
Sato

(10) Patent No.: US 6,288,914 B1
(45) Date of Patent: Sep. 11, 2001

(54) SWITCHING POWER SOURCE

(75) Inventor: Toshio Sato, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/590,229

(22) Filed: Jun. 8, 2000

(30) Foreign Application Priority Data

Jun. 9, 1999 (JP) ................................. 11-161769

(51) Int. Cl.$^7$ ................................. H02M 3/335
(52) U.S. Cl. ................................. 363/18; 363/79
(58) Field of Search ................................. 363/16, 18, 19, 363/37, 74, 78, 79, 80

(56) References Cited

U.S. PATENT DOCUMENTS

| | | | |
|---|---|---|---|
| 4,941,078 | * | 7/1990 | Leonardi ................................. 363/97 |
| 6,038,143 | * | 3/2000 | Miyazaki et al. ................................. 363/19 |
| 6,078,508 | * | 6/2000 | Okamura et al. ................................. 363/19 |

FOREIGN PATENT DOCUMENTS

| | | |
|---|---|---|
| 3243167 | 10/1991 | (JP) . |
| 410588 | 1/1992 | (JP) . |
| 412666 | 1/1992 | (JP) . |
| 429482 | 1/1992 | (JP) . |
| 6-319259 | 11/1994 | (JP) . |
| 9-308242 | 11/1997 | (JP) . |

OTHER PUBLICATIONS

Japanese Office Action issued Jul. 4, 2000 in a related application with English translation of relevant portions.

* cited by examiner

*Primary Examiner*—Jessica Han
(74) *Attorney, Agent, or Firm*—Ostrolenk, Faber, Gerb & Soffen, LLP

(57) ABSTRACT

In order to reduce a power consumption in a standby state of a load of a switching power source by intermittently controlling an oscillation of a switching element of the switching power source when the load is in the standby state, a time period covering a time at which a voltage of an A.C. power source 10 is a peak is detected by an intermittent oscillation control circuit 12 and supplies the detected time period to a switching control circuit 13 through signal transmission circuits 14 and 15 to allow an oscillation of a switching transistor Q1 for only that period while stop the oscillation thereof for other time than that time period. Since it is possible to perform the oscillation of the switching transistor Q1 for only a charging time of a smoothing capacitor C1 provided on a primary side of a switching transformer of the switching power source, a variation of a voltage on a secondary side of the switching transformer is minimized.

6 Claims, 4 Drawing Sheets

SWITCHING POWER SOURCE

CROSS REFERENCE TO RELATED APPLICATIONS

The present invention claims priority from Japanese Patent Application No.11-161769 filed Jun. 9, 1999, the contents of which are incorporated herein by reference.

BACKGROUND OF THE INVENTION

1. Field of the Invention

The present invention relates to a switching power source and, particularly, to a switching power source capable of reducing a standby power consumption of an electronic device as a load.

2. Description of Related Art

A conventional switching power source has been designed such that the power source efficiency becomes maximum for a load operating in a steady state. That is, the switching power source has been designed such that the power source efficiency becomes maximum for only a load of the, switching power source, which is operating normally and there has been no measure taken for power consumption when the load of the switching power source is light or the load is in a standby state. In view of this, it is usual to construct a power source with a main switching power source for a normal operation of a load and an additional switching power source such as a commercial power source transformer, the capacity of which corresponds to power required by the load in a standby state. With such power source construction, the cost of the power source for the load is increased and the size of the power source is also increased.

When the switching power source is used additionally, in order to reduce a switching loss during a standby state of a load, a switching frequency thereof during the standby state of the load is lowered. In such case, however, audible sound may be generated by the transformer.

In order to solve the problem of audible sound generation, a method for reducing power consumption when a load is light or the load is in a standby state has been proposed, in which an oscillator constituting the switching power source is controlled to oscillate intermittently while maintaining an oscillation frequency thereof, which is a switching frequency, unchanged. For example, Japanese Utility Model Application Laid-open No. H4-10588, Japanese Patent Application Laid-open No.3-243167, Japanese Patent Application Laid-open No. H4-12666 and Japanese Patent Application Laid-open No. H4-29482 disclose techniques belonging to such scheme.

However, in the techniques disclosed in Japanese Utility Model Application Laid-open No. H4-10588 and Japanese Patent Application Laid-open No.4-12666, the intermittent control of the oscillation state of oscillator is performed only when a load current is small. However, there is no description related to detail of such control. According to the technique disclosed in Japanese Patent Application Laid-open No. H3-243167, an interval of the intermittent oscillation control is determined by a CR time constant circuit. In the technique disclosed in Japanese Patent Application Laid-open No. H4-29482, the oscillation state is controlled intermittently on the basis of a voltage waveform of a commercial power source when a load is light.

In the techniques disclosed in these prior arts except that disclosed in Japanese Patent Application Laid-open No. H4-29482, the intermittent oscillation control is performed regardless of the voltage waveform of the commercial power source. Therefore, when the control is performed such that an oscillator oscillates during a time period other than a time period in which a charging capacitor constituting a primary side of a smoothing circuit for rectifying and smoothing a commercial power source voltage is charged, voltage ripple of the capacitor is increased, so that an output voltage on a secondary side of the smoothing circuit is varied.

Further, in the technique disclosed in Japanese Patent Application Laid-open No. H4-29482, the oscillation is stopped every half-wave rectified output of a commercial input power source although the intermittent oscillation control is performed correspondingly to the voltage waveform of the commercial power source. That is, the control is performed such that the oscillation is persistent for a half cycle of the commercial power source and is stopped for the other half cycle thereof. Therefore, the oscillation is persistent even for the period other than the period in which the charging of a primary side capacitor is performed and the above mentioned problem of the secondary side voltage variation is not solved.

SUMMARY OF THE INVENTION

An object of the present invention is to provide a switching power source including a switching transformer and capable of restricting voltage variation on a secondary side of the switching transformer when an intermittent oscillation for obtaining a switching operation of the switching power source is performed under a light load condition thereof According to the present invention, a switching power source device, which includes a rectifier, a switching transformer and a switching element and in which an input A.C. voltage is rectified by the rectifier and smoothed by a smoothing capacitor and a resultant D.C. voltage is supplied to a primary side of the switching transformer while on/off controlling the D.C. voltage by the switching element and an A.C. voltage obtained in a secondary side of the switching transformer is rectified and smoothed and a resultant D.C. voltage is supplied to a load of the switching power source device, is featured by comprising comparator means for comparing a D.C. voltage obtained by rectifying the input A.C. voltage with a reference voltage and control means for detecting a state of the load of the switching power source and intermittently controlling a switching operation of the switching element according to an output of the comparator means when the load is light.

The comparator means includes a comparator circuit for comparing the rectified D.C. voltage with the reference voltage and generating the output of the comparator means when the rectified D.C. voltage is larger than the reference voltage and the control means performs the intermittent control correspondingly to the output of the comparator means when the load is light. Further, the control means detects the state of the light load on the basis of a current supplied to the load. Alternatively, the control means detects the state of the light load by an external signal.

In intermittently controlling an oscillation for switching a power source device during a light load condition in order to reduce power consumption in a standby state thereof, the oscillation is allowed in only a peak time of an input A.C. power and a vicinity thereof and inhibited in other time period. Therefore, it becomes possible to oscillate in only a charging time of the smoothing capacitor on the primary side of the switching transformer to thereby minimize a voltage variation on the secondary side of the switching transformer.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Figure 1:
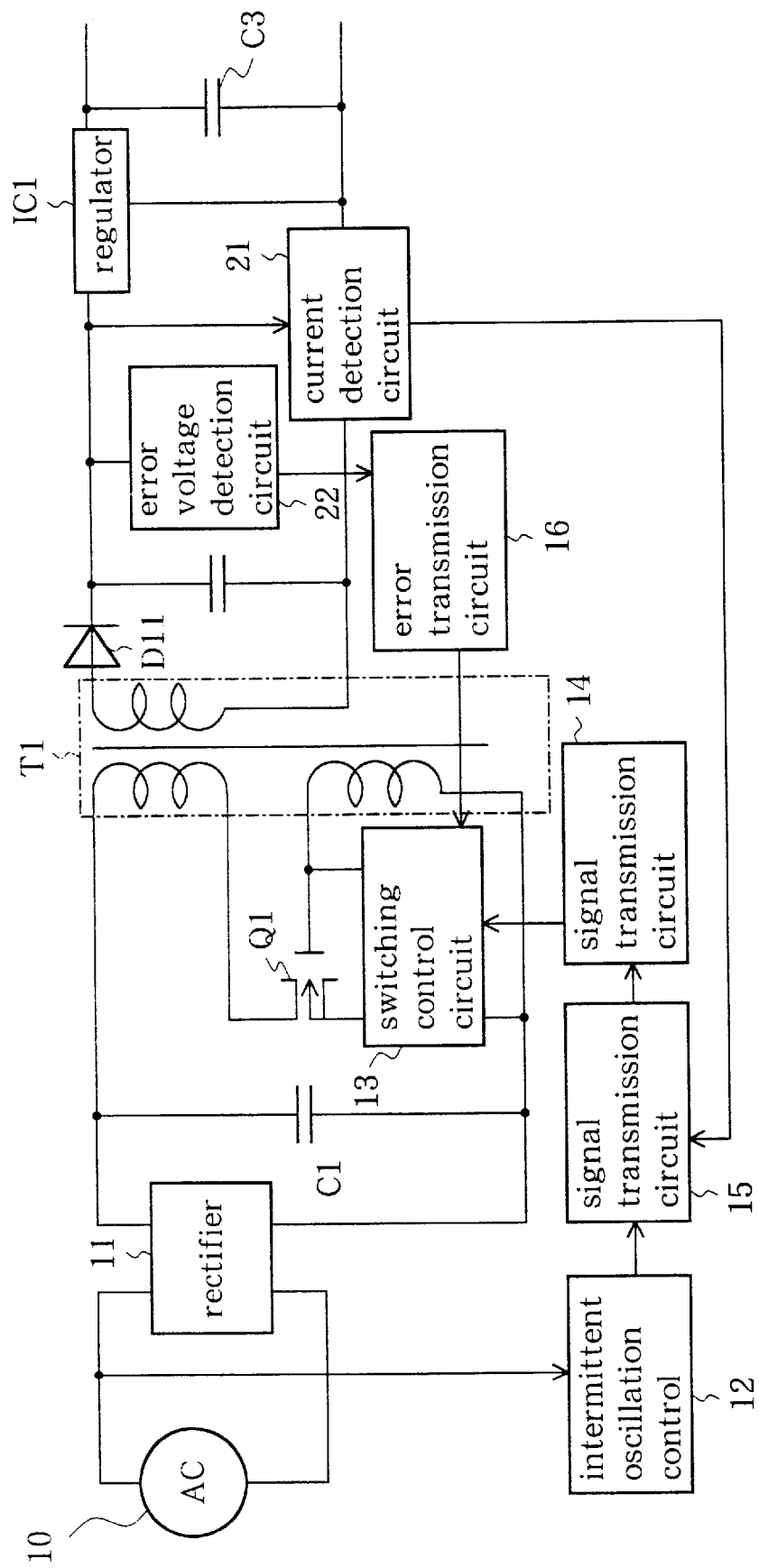
FIG. 1 is a circuit diagram of an embodiment of a switching power source according to the present invention.

FIG. 1 is a circuit diagram showing a switching power source according to an embodiment of the present invention. In FIG. 1, a voltage of a commercial power source 10 is rectified by a rectifier circuit 11, smoothed by a smoothing capacitor C1 and supplied to a primary side of a switching transformer T1. The switching power source includes a switching transistor Q1 as a switching element. The switching transistor Q1 as well as the rectified and smoothed D.C. voltage supplied to the primary side of the switching transformer T1 is ON/OFF controlled under an oscillation control of a switching control circuit 13. An output of a secondary side of the switching transformer T1 is rectified by a diode D1, smoothed by a capacitor C2 and supplied to a load, which is not shown, through a regulator IC1 as a D.C. voltage. In FIG. 1, an element depicted by C3 is a capacitor.

An error voltage detector circuit 22 is provided for detect a voltage supplied to the load. The error voltage detector circuit 22 compares the rectified and smoothed output voltage of the switching transformer Ti with a reference voltage to detect a difference therebetween, which is supplied to the switching control circuit 13 through an error voltage transmission circuit 16. The duty cycle of an oscillation signal of the switching transistor Q1 is controlled by the switching control circuit 13 according to the voltage difference signal from the error transmission circuit 16 to maintain the output voltage of the switching power source constant.

The switching power source further includes a current detection circuit 21 for detecting a current supplied to the load. When the load current, that is, an output current, becomes smaller than a setting current value, the current detector circuit 21 activates a signal transmission circuit 15 such that a signal for controlling the intermittent oscillation from the intermittent oscillation control circuit 12 provided on the primary side of the switching transformer 11 is transmitted to a signal transmission circuit 14. The intermittent oscillation control circuit 12 has a function of comparing the rectified voltage of the commercial power source 10 with a reference voltage and the switching control circuit 13 is controlled by an output of the intermittent oscillation control circuit 12 through the signal transmission circuits 15 and 14 to repeatedly switch the switching transistor Q1 between oscillation and non-oscillation states. Switching loss of the switching transistor Q1 in intermittent oscillation state when the load is light is reduced, so that the power source efficiency can be improved.

As mentioned, the current detector circuit 21 has the function of detecting the output current of the switching power source and comparing the output current with the setting current. The signal transmission circuit 15 is activated by the output current detected by the current detector circuit 21 to transmit the comparison signal from the intermittent oscillation control circuit 12 to the switching control signal 13 through the signal transmission circuit 14. Therefore, the signal transmission circuit 15 has a role of a comparison output switch of the intermittent oscillation control circuit 12. When the output current measured by the current detector circuit 21 becomes smaller than a certain setting current value, the signal transmission circuit 15 is activated to pass the output of the intermittent oscillation control circuit 12 to the signal transmission circuit 14. On the other hand, when the output current detected by the current detector circuit 21 becomes larger than the setting current, the signal transmission circuit 15 is deactivated to block the output of the intermittent oscillation control circuit 12 to the signal transmission circuit 14.

The intermittent oscillation control circuit 12 has a function of generating a D.C. voltage from the A.C. voltage of the commercial power source 10 and compares the D.C. voltage with a reference voltage. As a result of comparison outputted from the intermittent oscillation control circuit 12 is transmitted to the switching control circuit 13 through the signal transmission circuit 14. When the output current of the switching power source becomes smaller than the setting current, the switching control circuit 13 responds to the signal from the intermittent oscillation control circuit 12 to repeatedly switch the switching operation of the switching transistor Q1 between oscillation state and non-oscillation state.

Figure 2:
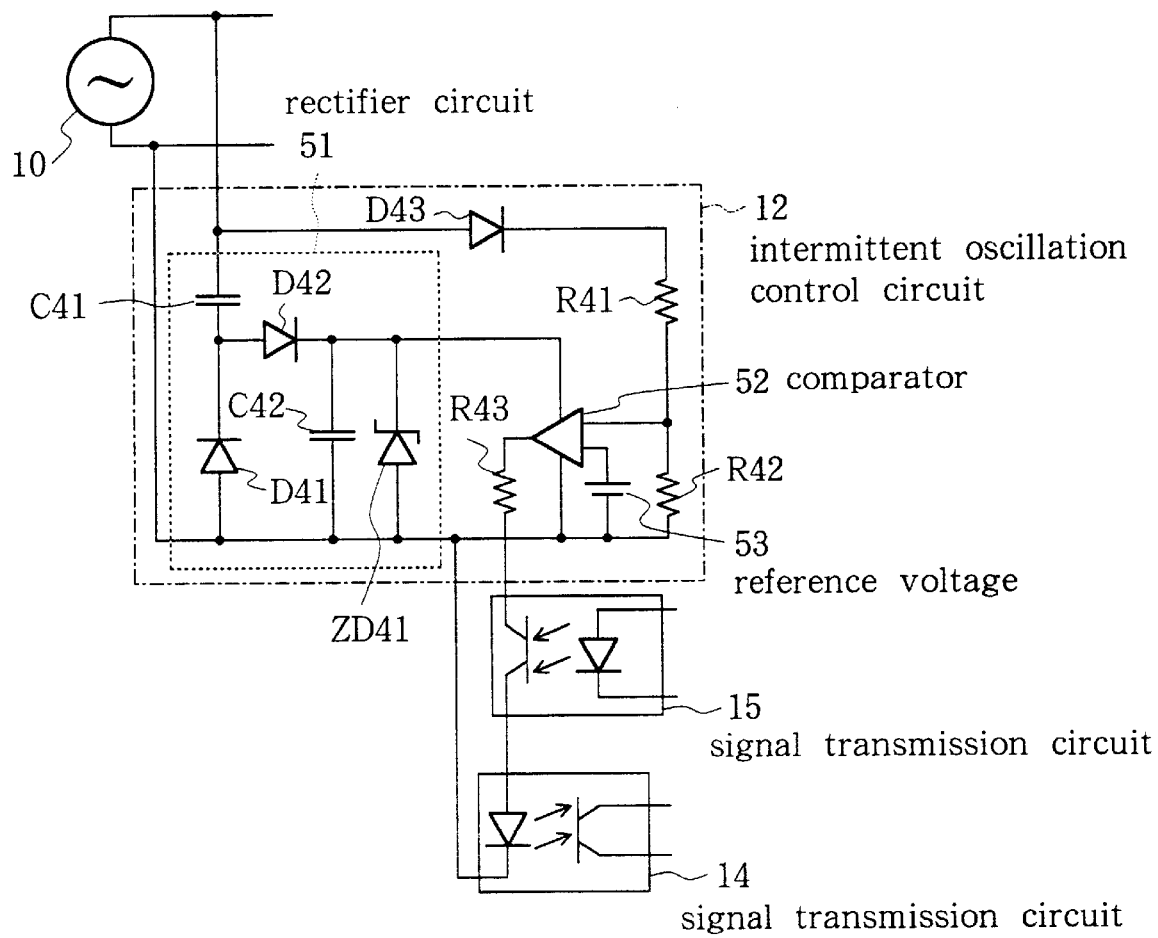
FIG. 2 is a detailed circuit diagram of a portion of the switching power source shown in FIG. 1.

FIG. 2 is a detailed circuit diagram of the intermittent oscillation control circuit 12 shown in FIG. 1. The intermittent oscillation control circuit 12 is constructed, basically, with a rectifier circuit 51 for rectifying the A.C. voltage of the commercial power source 10 to obtain the D.C. voltage and a comparator 52. The comparator 52 compares a half-wave rectified voltage from a diode D43 with a reference voltage 53. An output of the comparator 52 can be variable by changing a setting value of the reference voltage 53.

The rectifier circuit 51 is constructed with capacitors C41 and C42, diodes D41 and D42 and a Zener diode ZD41. The rectifier circuit 51 itself is not constitute the present invention. Its construction is not limited to that shown in FIG. 2 and any other construction may be used on demand.

Now, an operation of the switching power source shown in FIG. 1 will be described. In FIG. 1, when the output current of the switching power source exceeds the setting current of the current detector circuit 21, the signal transmission circuit 15 becomes in an OFF state. Therefore, the output signal of the intermittent oscillation control circuit 12 is not transmitted to the signal transmission circuit 14, so that the switching control circuit 13 performs a normal oscillation control operation. When the output current of the switching power source is reduced when the load is varied by change of the state of the load from a normal operation state to a standby state, the output current may become smaller than the setting current. When the output current of the switching power source becomes smaller than the setting value, the current detector circuit 21 causes the signal transmission circuit 15 to turn ON. Therefore, the output signal of the intermittent oscillation control circuit 12 can be transmitted to the signal transmission circuit 14 and controls the switching control circuit 13. By turning the switching control circuit 13 ON and OFF in this manner, the switching transistor Q1 as the main switch element can be switched between the oscillation state and the non-oscillation state.

In the intermittent oscillation control circuit 12 shown in FIG. 2, which is constructed mainly with the rectifier circuit 51 and the comparator 52, the rectifier circuit 51 half-wave rectifies the A.C. voltage of the commercial power source 10 by means of the diode D43 thereof to obtain a half-wave rectified D.C. voltage and the half-wave rectified D.C. voltage is supplied to one input of the comparator 52. The half-wave rectified D.C. voltage can be arbitrarily set by changing a threshold value of the Zener diode ZD41, provided that the halfwave rectified D.C. voltage is within a power source voltage range of the comparator 52. However, since a loss in the comparator 52 may be increased if the power source voltage of the comparator 52 is set to a certain high value, it is preferable in this embodiment to set the half-wave rectified D.C. voltage to 5V.

Figure 3:
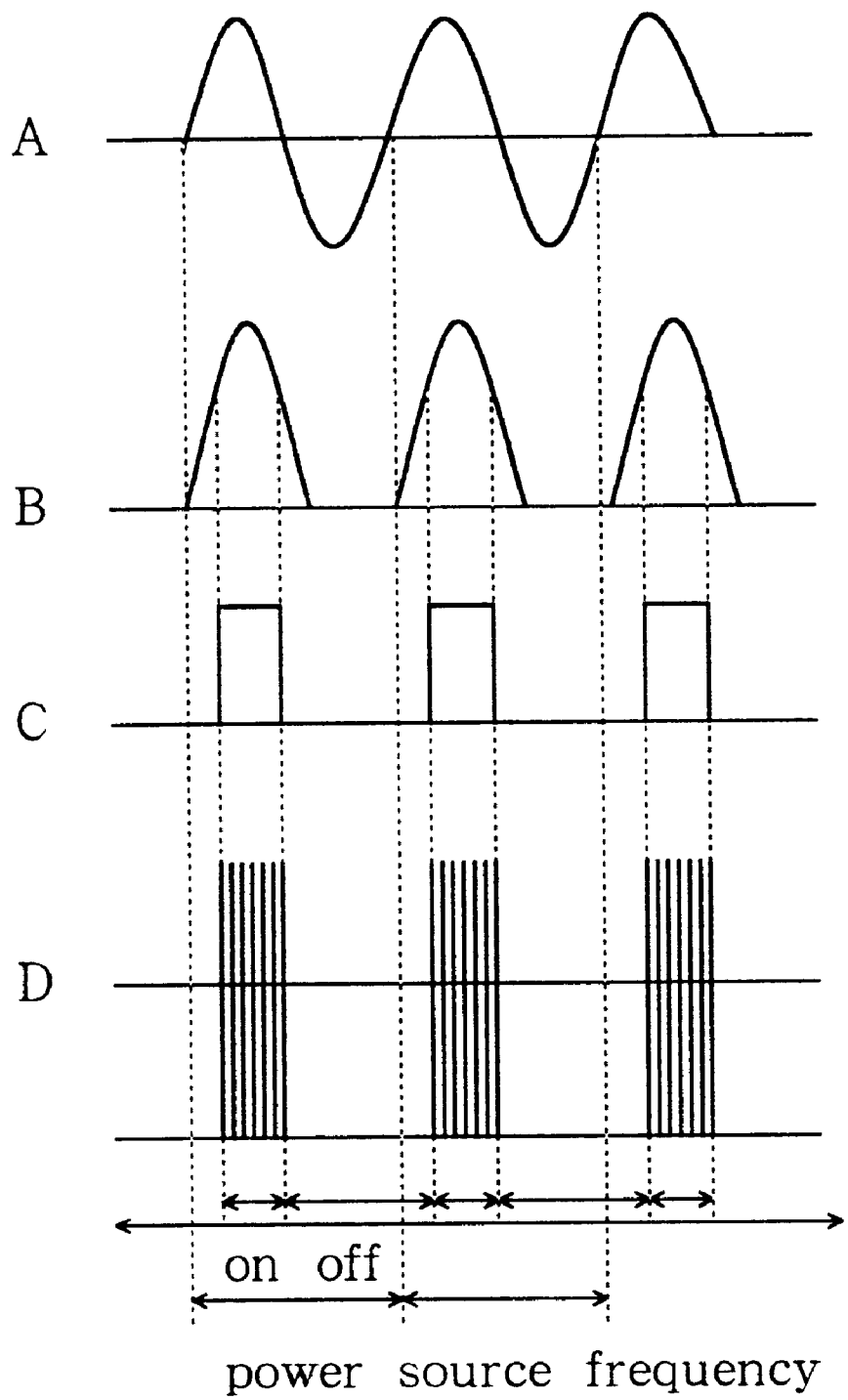
FIG. 3 shows waveforms in various portion of the switching power source shown in FIG. 1.

The reference voltage 53 and the half-wave rectified D.C. voltage, which has a waveform shown by B in FIG. 3 and divided by the resistors R41 and R42 are inputted to the comparator 52. The half-wave rectified D.C. voltage is compared with the reference voltage 53 in the comparator 52 and a signal having a waveform shown by C in FIG. 3 is outputted from the comparator 52. Width of the ON portion of the output waveform C of the comparator 52 can be changed by changing the setting value of the reference voltage 53.

By setting the ON width of the output waveform of the comparator 52 to a period corresponding to the charging period of the smoothing capacitor C1 on the primary side of the switching transformer T1, it is possible to oscillate the switching transistor Q1 for only the charging period of the capacitor C1 and to stop the oscillation thereof for other time period to thereby eliminate ripple on the secondary side of the switching transformer T1. Incidentally, since the ON width of the switching waveform of the switching transistor Q1 in FIG. 3 can be freely changed by changing the setting value of the reference voltage 53, it is possible when the output ripple is increased by the intermittent oscillation, to prevent any trouble due to ripple from occurring by reducing the ON width.

The output waveform C of the comparator 52 controls the switching control circuit 13 through the signal transmission circuit 14. As a result, an intermittent oscillation waveform D of the transistor Q1 shown in FIG. 3 is obtained. That is, by providing the OFF period of the oscillation of the switching transistor Q1, it becomes possible to reduce the switching loss on the primary side of the switching transformer T1. This intermittent operation of the switching power source attributes to reduction of the power consumption of the switching power source.

When the output current of the switching power source is increased when the load thereof is changed by change of the state of the load from the standby state to the normal operation state, the signal from the current detector circuit 21 turns the signal transmission circuit 15 OFF, so that the output of the intermittent oscillation control circuit 12 is not transmitted to the switching control circuit 13. As a result, the intermittent oscillation of the switching transistor Q1 is changed to a continuous oscillation and the usual operation of the switching power source is automatically recovered.

Figure 4:
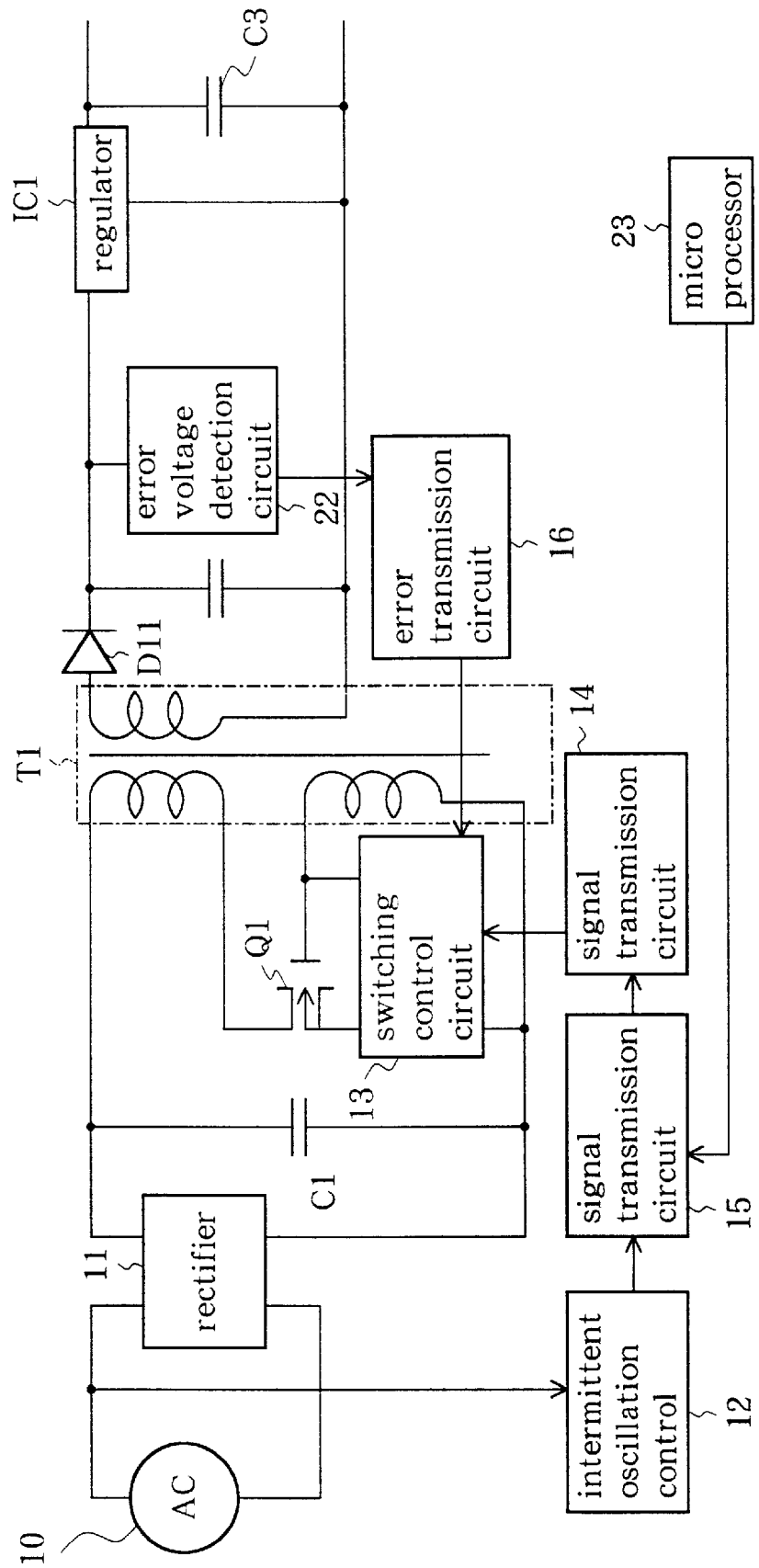
FIG. 4 is a circuit diagram of another embodiment of the switching power source according to the present invention.

Incidentally, although the signal transmission circuits 14 and 15 are constructed by using known photo-couplers, respectively, as shown in FIG. 2, the constructions of the signal transmission circuits are not limited thereto. Further, in FIG. 1, the normal operation state of the load and the standby state of the load are determined by utilizing the output of the current detector circuit 21. However, when the load device includes a micro processor 23 as shown in FIG. 4, it is possible that the micro processor 23 determines the state of the load and sends the state information of the load directly to the signal transmission circuit 15 to ON/OFF control the output of the intermittent oscillation control circuit 12. For example, in a case where the load is a television receiver, it is usual that a micro processor detects a remote control operation for turning a power source on. Therefore, a change of the state of the television receiver from a standby state to a normal operation state, that is, a turning-on of the power source of the television receiver, is detected by the micro processor. In such case, the signal transmission circuit 15 may be activated by a detection signal from the micro processor.

As described hereinbefore, according to the present invention, it is possible to reduce the power consumption when the load is in the standby state or the load is light. This is because the switching loss can be reduced by providing the off period in the main switching operation by intermittently oscillating the main switching operation. According to the present invention, the switching power source can be constructed with using a single power source, without requiring any power source dedicated to the light load or dedicated to the standby state of the load. That is, since the switching loss when the load is light is reduced, the present invention can be applied to a switching power source having any capacity. Further, the switching transformer of the switching power source does not produce audible sound. That is, instead of reducing the switching frequency, which is usually used in the conventional intermittent oscillation system, the intermittent oscillation operation is performed by a repeated ON/OFF operation of the switching transistor without changing the switching frequency thereof. Further, the voltage ripple on the secondary side of the switching transformer is restricted. That is, the oscillation of the switching transistor is maintained for only the charging period of the smoothing capacitor on the primary side of the switching transformer and is stopped for other period than the charging period.

What is claimed is:

1. A switching power source comprising a switching transformer, first rectifying and smoothing means provided on a primary side of said switching transformer for rectifying and smoothing an input A.C. voltage to obtain a first D.C. voltage, a switching element provided on said primary side of said switching transformer for supplying the first D.C. voltage to said primary side of said switching transformer while ON/OFF controlling the first D.C. voltage, second rectifying and smoothing means for rectifying and smoothing a second A.C. voltage to obtain a second D.C. voltage and supplying the second D.C. voltage to a load, comparator means for comparing the first D.C. voltage with a reference voltage and control means for detecting a state of said load and intermittently controlling an oscillation for a switching operation of said switching element correspondingly to an output of said comparator means when said load is light.

2. A switching power source as claimed in claim 1, wherein said comparator means includes a comparator circuit for comparing the first D.C. voltage obtained by rectifying the A.C. voltage with a predetermined reference voltage and producing the output of said comparator means when the first D.C. voltage is higher than the reference voltage.

3. A switching power source as claimed in claim 2, wherein said control means performs the intermittent control of the oscillation of said switching element correspondingly to the output of said comparator means.

4. A switching power source as claimed in claim 1, wherein said control means detects the light state of said load on the basis of a current supplied to said load.

5. A switching power source as claimed in claim 1, wherein said control means detects the light state of said load on the basis of an external signal.

6. A switching power source as claimed in claim 1, wherein said comparator circuit is driven by a D.C. voltage obtained by rectifying and smoothing the input A.C. voltage.

* * * * *